(12) United States Patent
Gee et al.

(10) Patent No.: US 9,057,283 B2
(45) Date of Patent: Jun. 16, 2015

(54) BEARING COOLING SYSTEM FOR FLEXIBLE SHAFT TURBOMACHINE

(75) Inventors: Mark Gee, South Pasadena, CA (US); Marshall Saville, Torrance, CA (US); Keith Alan Hurley, Garden Grove, CA (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 653 days.

(21) Appl. No.: 13/439,663

(22) Filed: Apr. 4, 2012

(65) Prior Publication Data

US 2013/0266417 A1    Oct. 10, 2013

(51) Int. Cl.
*F01D 25/16* (2006.01)
*F01D 25/12* (2006.01)
*F02C 7/06* (2006.01)

(52) U.S. Cl.
CPC ............ *F01D 25/125* (2013.01); *F01D 25/164* (2013.01); *F02C 7/06* (2013.01); *F05D 2240/52* (2013.01); *Y02T 50/675* (2013.01)

(58) Field of Classification Search
USPC .............................................. 415/180, 216.1
See application file for complete search history.

(56) References Cited

U.S. PATENT DOCUMENTS

| | | | | |
|---|---|---|---|---|
| 5,113,670 A | * | 5/1992 | McAuliffe et al. | 62/402 |
| 5,249,934 A | * | 10/1993 | Merritt et al. | 417/406 |
| 5,857,835 A | * | 1/1999 | Rolt | 416/95 |
| 7,633,193 B2 | | 12/2009 | Masoudipour et al. | |
| 7,948,105 B2 | | 5/2011 | Agrawal et al. | |
| 8,376,690 B2 | * | 2/2013 | Saville et al. | 415/124.2 |
| 2011/0135463 A1 | | 6/2011 | Saville et al. | |

* cited by examiner

*Primary Examiner* — Richard Edgar
(74) *Attorney, Agent, or Firm* — Shimokaji IP

(57) ABSTRACT

A turbomachine having gas cooled bearings may include an axially-oriented, cooling-gas passageway interconnecting first and second bearing chambers. The passageway may include grooves formed at an interface between an aerodynamic component of the turbomachine (e.g., a wheel or impeller) and a portion of a shaft assembly of the turbomachine.

16 Claims, 5 Drawing Sheets

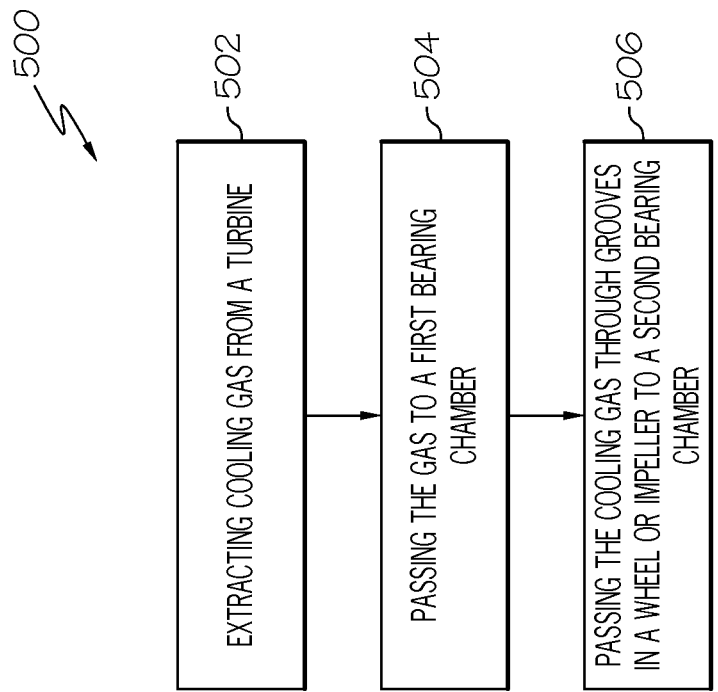

BEARING COOLING SYSTEM FOR FLEXIBLE SHAFT TURBOMACHINE

BACKGROUND OF THE INVENTION

The present invention relates to bearing cooling for high speed turbomachinery

Aircraft environmental control systems incorporate an air cycle machine, also referred to as an air cycle cooling turbine, for use in cooling and dehumidifying air for supply to the aircraft cabin for occupant comfort. On aircraft powered by turbine engines, the air to be conditioned in the air cycle machine is typically compressed air bled from one or more of the compressor stages of the turbine engine. This bleed air is passed through the air cycle machine compressor wherein it is further compressed and then passed through a series of heat exchangers including a condensing heat exchanger to cool the compressed air sufficiently to dehumidify it. The compressed bleed air being supplied to the compressor of the air cycle machine is typically precooled by passing it through a pre-cooling heat exchanger.

The expanded and precooled turbine exhaust air is expanded in a second turbine to further cool the expanded air to a desired temperature for supply to the cabin as conditioned cooling air. To be suitable for use in such an air conditioning system of an aircraft, an air cycle machine must have four wheels, i.e. two turbines, a compressor and a fan. To achieve optimal aerodynamic efficiency, there is a need to utilize more than two journal bearings to support a shaft that connects the four wheels. When a shaft is supported on more than two journal bearings it is desirable to introduce a flexible link in the shaft so that the shaft may be constructed with a bending critical speed that is lower than a normal rotational speed of the turbomachine. Such a turbomachine is described in US Patent Application Publication No. 20110135463 dated Jun. 9, 2011 which publication is incorporated herein by reference.

A turbomachine that is constructed with three journal bearings may be constructed with two thrust bearings. All of these journal and thrust bearings may require cooling during operation of the turbomachine. Typically such cooling is provided with gas flow from one of the turbines. The cooling gas flow may be directed to the bearings through a complex combination of external tubing and internal passageways.

As can be seen, there is a need for a four wheel air cycle machine design that allows for distribution of bearing cooling gas flow through a simplified internal gas passageway system.

SUMMARY OF THE INVENTION

In one aspect of the present invention, a turbomachine having gas cooled bearings may include an axially-oriented, cooling-gas passageway interconnecting first and second bearing chambers. The passageway may include grooves formed at an interface between an aerodynamic component (e.g., a wheel and/or impeller) of the turbomachine and a portion of a shaft assembly of the turbomachine.

In another aspect of the present invention, an air cycle machine may have a single shaft assembly supported on three journal bearings. A cooling gas passageway may interconnect at least two of the journal bearings. The cooling gas passageway may be internal to the shaft assembly.

In a further aspect of the present invention, a method for cooling bearings in a turbomachine may include extracting cooling gas from a turbine of the turbomachine and passing the gas from a first bearing chamber to a second bearing chamber through an axially-oriented cooling-gas passageway that includes grooves at an interface between a wheel and/or impeller of the turbomachine and a portion of a shaft assembly of the turbomachine.

These and other features, aspects and advantages of the present invention will become better understood with reference to the following drawings, description and claims.

BRIEF DESCRIPTION OF THE DRAWINGS

FIG. 5 is a flow chart describing a method according to an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

As used herein, the term "flexible", as it refers to a flexible link, is a relative term referring to a link connecting two shafts, wherein the flexible link may have a greater propensity for bending than the shaft itself. A "flexible link" may be flexible enough to lower a bending critical speed below the operating speed of a rotating machine.

Figure 1:
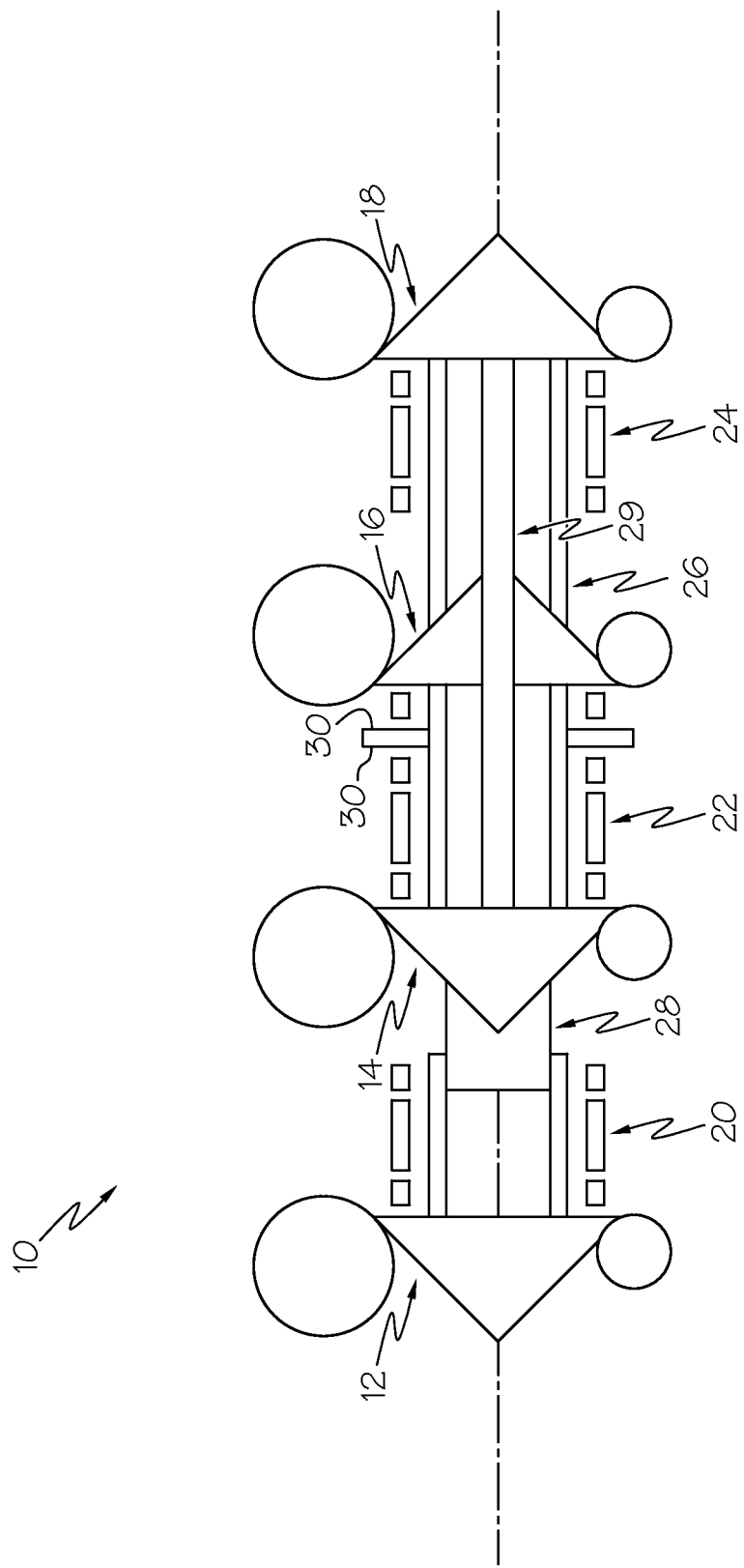
FIG. 1 is a schematic cross-sectional drawing of an air cycle machine according to an embodiment of the present invention.

Referring to FIG. 1, there is shown a cross-sectional drawing of a portion of an air cycle machine or turbomachine 10 according to an exemplary embodiment of the present invention. The turbomachine 10 may include, as rotating components, a fan 12, a compressor 14 and first and second turbines 16, 18. The turbomachine 10 may include bearings, such as journal bearings 20, 22 and 24 and thrust bearings 30. The rotating components may be mounted on a shaft assembly 26. At least a portion of the shaft assembly 26 may include a flexible link 28. The shaft assembly 26 may be held together with a tie rod 29. According to one embodiment of the present invention, as shown in FIG. 1, the flexible link 28 may be positioned between the fan 12 and the compressor 14.

Figure 2:
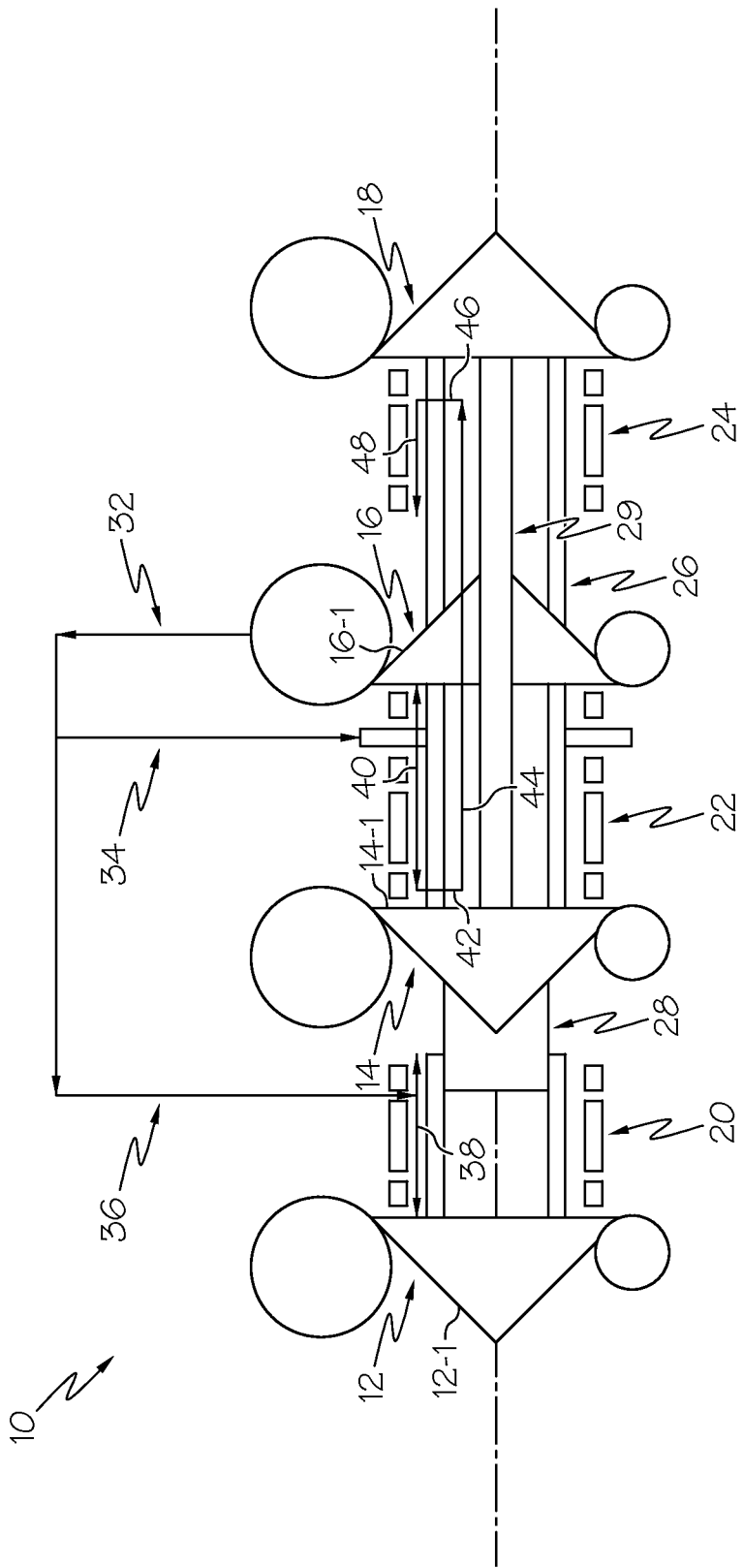
FIG. 2 is a schematic cross-sectional drawing of the air cycle machine of FIG. 1 showing cooling gas flow paths.

Referring now to FIG. 2, there is shown a pattern of cooling gas flow passageways which may carry cooling gas from the turbine 16 to the thrust bearings 30 (See FIG. 1) and the journal bearings 20, 22 and 24. A turbine-exit passageway 32 may be interconnected with bearing-input passageways 34 and 36. The passageway 36 may be interconnected with a bearing chamber 38 which may carry cooling gas to the journal bearing 20. The passageway 34 may be interconnected with bearing chamber 40 which may carry cooling gas to the journal bearing 22 and two thrust bearings 30 adjacent the bearing 22.

The bearing chamber 40 may be interconnected with a transitional passageway 42 which may carry cooling gas into an axially-oriented, cooling-gas passageway 44. A second transitional passageway 46 may interconnect the passageway 44 with a bearing chamber 48 within which cooling gas may cool the journal bearing 24.

Figure 3:
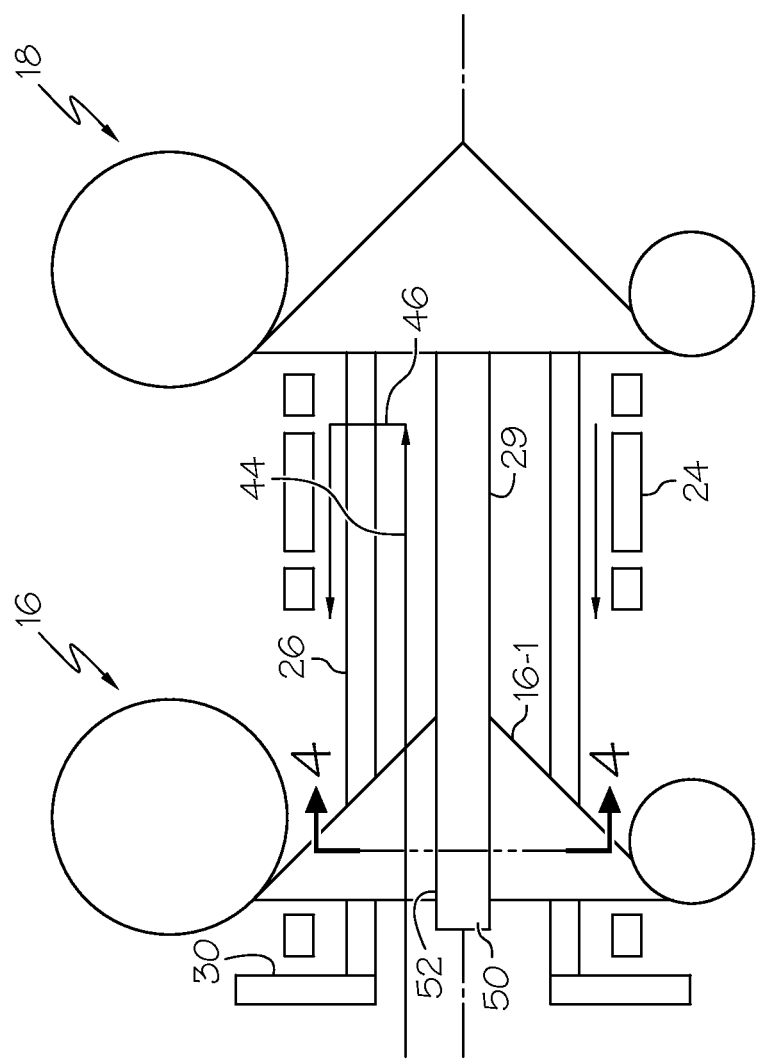
FIG. 3 is a detailed partial cross-sectional drawing of the air cycle machine of FIG. 1.
Figure 4:
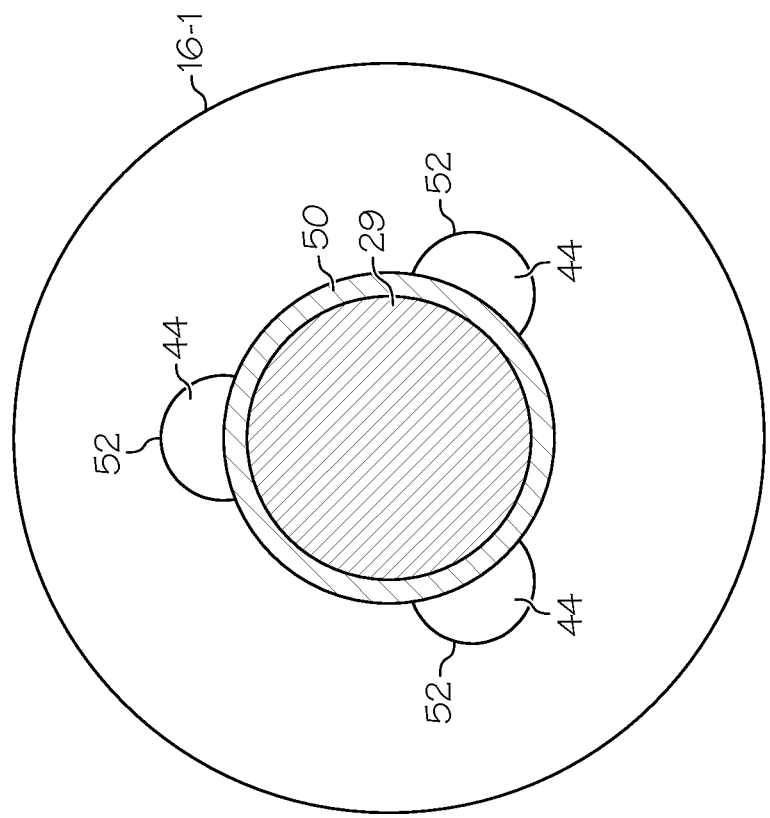
FIG. 4 is a cross-sectional view of air cycle machine of FIG. 3 taken along the lines 4-4.

Referring now to FIGS. 3 and 4, it may be seen the passageway 44 may pass axially along an interior of the shaft assembly 26. In that regard, the passageway 44 may pass through one or more aerodynamic components of the machine 10. In the exemplary configuration of FIGS. 2 and 3, the aerodynamic component through which passageway 44 passes may be the wheel 16-1 of the turbine 16. In alternate configurations, a cooling gas passageway may pass through other ones of the aerodynamic components of the machine 10, e.g., impellers 14-1 or 12-1 of the compressor 14 or fan 12.

Referring particularly to FIG. 4, it may be seen the passageway 44 may include one or more sub-passageways. The sub-passageways may be grooves 52 formed at an interface between the turbine wheel 16-1 and a portion of the shaft assembly 26. In an exemplary embodiment the grooves 52 may be formed in the turbine wheel 16-1. Advantageously such an arrangement may allow for an enlarged portion 50 of the tie rod 29 to be tightly engageable with the wheel 16-1, thus providing desirable dynamic stability for the shaft assembly 26. In other words, cooling gas may flow past the wheel 16-1 even though the wheel 16-1 may be tightly engaged with the enlarged portion 50 of the tie rod 29.

In an exemplary embodiment of the turbomachine 10, the cooling gas may be air. In this respect, the turbomachine 10 may differ from machines that may utilize gaseous refrigerant as a cooling gas. Cooling bearings with air as compared to refrigerant may require a higher volumetric flow rate of air as compared to that of refrigerant because the density of air is lower than that of gaseous refrigerant at an equivalent pressure. The grooves 52 in the wheel 16-1 may be made large enough to accommodate a required amount of gas flow that may be needed to fully cool the bearings 24 even though the cooling gas may be air and not gaseous refrigerant. In an exemplary embodiment, sufficient gas flow may be attained with three of the grooves 52 that may be semicircular in cross-section with a radius of about 0.25 inch to about 0.50 inch.

Referring now to FIG. 5, a flow chart 500 may illustrate an exemplary embodiment of a method for cooling bearings in a turbomachine. In a step 502, cooling gas may be extracted from a turbine (e.g., air may be extracted from the turbine 16 and directed into the passageway 34). In a step 504, the cooling gas may be passed in a first bearing chamber (e.g., the cooling gas may emerge from the passageway 34 into the bearing chamber 40). In a step 506, the cooling gas may be passed to a second bearing chamber through grooves in a wheel or impeller (e.g., the cooling gas may emerge from the bearing chamber 40, enter a transitional passageway 42, pass through grooves 52 formed in the wheel 16-1 of the turbine 16 and then enter the bearing chamber 48).

It should be understood, of course, that the foregoing relates to exemplary embodiments of the invention and that modifications may be made without departing from the spirit and scope of the invention as set forth in the following claims.

What is claimed is:

1. A turbomachine having gas cooled bearings comprising;
an axially-oriented, cooling-gas passageway interconnecting first and second bearing chambers,
wherein the passageway includes one or more grooves formed at an interface between an aerodynamic component of the turbomachine and a portion of a shaft assembly of the turbomachine
wherein the aerodynamic component is tightly engaged with the portion of the shaft assembly.

2. The turbomachine of claim 1, wherein the portion of the shaft assembly is a tie rod.

3. The turbomachine of claim 1 wherein the grooves are formed in a wheel of a turbine.

4. The turbomachine of claim 1 wherein the grooves are formed in an impeller.

5. The turbomachine of claim 4 wherein the grooves are semicircular in cross-sectional shape.

6. The turbomachine of claim 1 wherein the shaft assembly is supported on more than two journal bearings.

7. The turbomachine of claim 1 wherein the shaft assembly includes a flexible link.

8. The turbomachine of claim 1 further comprising at least two turbines.

9. The turbomachine of claim 8 wherein cooling gas emerges from one of the turbines.

10. The turbomachine of claim 9 wherein the cooling gas is air.

11. An air cycle machine having a single shaft assembly supported on three journal bearings comprising;
a cooling gas passageway interconnecting at least two of the journal bearings, the cooling gas passageway being internal to the shaft assembly;
wherein the cooling gas passageway includes grooves formed at an interface between a wheel of a turbine, or an impeller of a compressor or fan, and a tie rod of the shaft assembly;
wherein the tie rod has an enlarged portion and the wheel or impeller is tightly engaged with the enlarged portion.

12. The air cycle machine of claim 11 wherein one or more grooves are formed in the wheel or impeller.

13. The air cycle machine of claim 12 including three of the grooves and wherein the grooves are semicircular in cross-sectional shape.

14. The air cycle machine of claim 11 wherein at least two journal bearings are positioned in bearing chambers and thrust bearings are positioned in the bearing chambers.

15. A method for cooling bearings in a turbomachine comprising:
extracting cooling gas from a turbine or compressor of the turbomachine; and
passing the gas from a first bearing chamber to a second bearing chamber through an axially-oriented cooling-gas passageway that includes grooves at an interface between a wheel of the turbomachine and a portion of a shaft assembly of the turbomachine;
wherein the wheel is maintained in a tightly engaged relation with a tie rod of the shaft assembly.

16. The method of claim 15 wherein the cooling gas is air.

* * * * *